United States Patent [19]
Barnes et al.

[11] Patent Number: 5,139,808
[45] Date of Patent: Aug. 18, 1992

[54] PROCESS OF MAKING FROZEN PASTA

[75] Inventors: Gale J. Barnes, Woodbury; Jau Y. Hsu, Brookfield; Louise B. Wyant, New Milford, all of Conn.

[73] Assignee: Nestec S.A., Vevey, Switzerland

[21] Appl. No.: 759,482

[22] Filed: Sep. 13, 1991

[51] Int. Cl.$^5$ ............................................. A23L 1/16
[52] U.S. Cl. ................................... 426/557; 426/524
[58] Field of Search ...................... 426/557, 451, 524

[56] References Cited

U.S. PATENT DOCUMENTS

| | | | |
|---|---|---|---|
| 3,798,343 | 3/1974 | Vitale | 426/524 |
| 4,308,295 | 12/1981 | Kuntz et al. | 426/524 |
| 4,579,746 | 4/1986 | Hirose | 426/557 |
| 4,693,900 | 9/1987 | Molinari | 426/128 |

*Primary Examiner*—Jeanette Hunter
*Assistant Examiner*—Mary S. Mims
*Attorney, Agent, or Firm*—Vogt & O'Donnell

[57] ABSTRACT

A frozen pasta is prepared by cooking a shaped pasta dough, partially drying the cooked pasta, blending the partially dried pasta with a sauce or water or a combination thereof and then freezing the blend.

18 Claims, No Drawings

PROCESS OF MAKING FROZEN PASTA

BACKGROUND OF THE INVENTION

The present invention relates to a process for the production of frozen pasta, more particularly to pre-cooked frozen pastas.

In order to prepare a good pre-cooked frozen pasta with the desired pasta firmness the pasta should be cooked at a high temperature (e.g., above 97° C.) for the appropriate time to obtain the optimum cooked moisture content of from about 60-70%. Normally, the firmness is inversely proportional to the moisture content e.g., pastas with 60% moisture are firmer than pastas with 64% moisture. However, if pastas are not cooked well (e.g., at a water temperature less than 97° C.) the cooked pastas have a poor texture (sticky and soft) regardless of the cooked pasta's moisture content, and the pastas are not as firm as pastas cooked at 97° C. with the same moisture content because starch leaches out during cooking at lower temperatures.

However, when cooking at temperatures of at least 97° C., there is a basic texture problem because it is difficult to control the optimum cooked moisture (and consequently the optimum firmness) owing to the fact that when the pastas are packaged with sauce or water and then frozen, there is a continuous water absorption by the cooked pastas during the freezing, thawing and reheating for consumption stages. For example, a sample of 100 g cooked pasta containing 63% moisture packaged with 200 g water and frozen over 2 hours would absorb moixture until the moisture content is 72.8%. If the package is thawed by microwave heating, the moisture content would increase to 73.9%. Even if the water is replaced by a sauce, the moisture increase is less but still substantial, especially if large quantities of products are packaged, such as products for food service use, which require longer freezing and heating times. The texture of pastas with 73% moisture content is less than desirable. On the other hand if the pastas are cooked to only 58% moisture, the moisture content could increase to 68% after the freezing (with sauce or water) and heating steps to fall within the optimum moisture range of cooked pastas with good texture, but at 58% moisture, the pastas are not fully cooked and have a mealy texture.

Lastly, it is known that dehydrated pastas after they are cooked and packaged with water or sauce retain pasta firmness better than fresh extruded or sheeted raw pastas after they are cooked and packaged with sauce or water because the former absorb less moisture than the latter.

SUMMARY OF THE INVENTION

We have found that if the pastas are cooked to a moisture content of from 60-70% and then partially dried to a moisture content of from 40-60%, the partially dried cooked pastas do not absorb moisture rapidly during the freezing and heating stages and the moisture increase would not result in a soft pasta texture like either regular cooked pastas without drying or dry, cooked pastas when they are packaged with sauce or water.

Accordingly, the present invention provides a process for the production of a frozen pasta which comprises cooking a pasta which is a shaped dough or a dehydrated pasta dough, partially drying the cooked pasta, blending with either sauce or a combination of sauce and water or water alone and then freezing.

DETAILED DESCRIPTION OF THE INVENTION

Any kind of pasta dough may be used in the process of this invention, and the flour used may be, for example, Semolina wheat, Durum wheat, whole wheat flour, corn flour, pre-gelatinized corn flour, rice flour, waxy rice flour, pre-cooked rice flour, potato flour, pre-cooked potato flour (potato flake), lentil flour, pea flour, soy flour, farina, white and red bean flours (kidney and pinto bean), Mung bean starch, corn starch, wheat starch, rice starch, potato starch, pea starch, etc.

If desired, other materials conventionally used in making pasta doughs may be added to the flour, for example, protein materials, gums or surfactants. The protein material may be present in an amount up to 10% by weight based on the weight of the flour and examples of protein materials are egg products, such as egg white, whole egg or egg yolk, wheat gluten and soy protein isolate. The gum material may be present in an amount up to 5% by weight based on the weight of flour, and examples of gums are alginate gums, such as propylene glycol alginate, sodium alginate and potassium alginate. The surfactant may be present in an amount up to 3% by weight based on the weight of the flour, and an example of a surfactant is glyceryl monostearate.

In addition, vegetable materials such as spinach, carrot or tomato may be added to the flour, for instance, in an amount up to 5% by weight based on the weight of the flour. These vegetables may be fresh, dehydrated or frozen.

The amount of water mixed with the flour and any other ingredients present is conveniently from 17.5% to 30% and preferably from 20% to 28% by weight based on the weight of the flour and water. The optimum amount of water depends on the type of flour. For example, for fine Durum wheat, the amount of water is preferably from 24% to 28% by weight, while for coarse Semolina wheat, the amount of water is preferably from 20% to 24% by weight, based on the weight of the flour and water.

The flour and water and any other ingredients present may be mixed into the dough by using any conventional mixer which can ensure complete mixing of flour and water leaving substantially no flour unmixed, for instance, a Hobart mixer or the mixing compartment attached to most pasta extruders.

The pasta shaped dough may be in the form of pasta shapes obtained by extrusion or by sheeting and cutting of the raw pasta dough. Alternatively, the pasta shaped dough may be in the form of a sheet to be used for filled pastas, e.g., ravioli, tortellini, which is prepared by extruding or sheeting the raw pasta dough. The pasta shaped dough may also be dried before being cooked. The pre-cooking of the pasta dough is conveniently carried out by heating in water at a temperature of at least 97° C., preferably boiling water. The cooked pasta suitably has a moisture content of from 60 to 70%.

The pre-cooked pasta is then partially dried, suitably to a moisture content of from 40 to 60%, preferably from 42 to 55%. The partial drying is conveniently carried out by a short time, high temperature heating process, for example from 120° to 185° C., preferably from 135° to 175° C. for a period of from 1 to 15 minutes, preferably from 2 to 10 minutes.

Advantageously, the cooked pasta is coated with a solid or liquid food-acceptable fatty material before being partially dried. The fatty material may be saturated or unsaturated and may be, for example, corn oil, olive oil, cotton seed oil, butter, cream or margarine. The amount of fatty material on the coated cooked pasta is conveniently from 0.5 to 5% and preferably from 1 to 3% by weight based on the weight of the cooked pasta.

In a preferred embodiment, before blending with water or a combination of sauce and water, the partially dried cooked pasta is chilled to a temperature from 0° C. to 15° C. and preferably from 2° C. to 7° C. When blending the partially dried cooked pasta with water, the amount of water added may be from 2 to 10 times the amount of partially dried cooked pasta, whereas when blending with sauce and water, the amount of be from 1 to 3 times the amount of partially dried cooked pasta on a weight to weight basis together with a small amount of water, based on the amount of water removed from the cooked pasta during the partial drying step. This amount of added water is preferably equal to or less than the amount of water removed during the partial drying step depending on the degree of firmness desired, in that less water gives a firmer texture.

For the production of the frozen pasta product of the present invention, the partially dried cooked pasta together with the added sauce or water is deep frozen, preferably in a suitable package for storage. For consumption, the frozen pasta may be thawed, e.g., by microwave heating and then reheated.

EXAMPLES

The following Examples further illustrate the present invention. In the Examples the Pasta Firmness readings were obtained from 50 g pastas placed in a Kramer cell shear press (in a TA-XT2 Texture Analyzer).

EXAMPLE 1

A pasta dough mixture of 77.5% Durum flour and 22.5% water was prepared and extruded into elbow macaroni pasta shape. The elbow macaroni was boiled to a moisture content of 62.8%, then coated with 2% butter and partially dried in a fluidised bed hot air dryer at a temperature of 149° to 163° C. for 3 minutes to a moisture content of 46.2%. These partially dried macaroni (25.1%) were blended with 64.4% cheese sauce and 10.5% water and then frozen.

After 5 months storage, these frozen macaroni were heated in an oven at 204° C. for 1 hour, and kept warm on a steamtable for 45 minutes. The firmness and moisture content of the macaroni were determined and found to be as shown in Table 1.

TABLE 1

| Sample conditions | Firmness | Moisture content |
|---|---|---|
| After oven heating | 8.3 kg | 71.5% |
| After steamtable standing | 7.4 kg | 76.6% |

COMPARATIVE EXAMPLE A

A similar procedure to that described in Example 1 was followed except that the boiled cooked macaroni were not coated with butter, were not partially dried, and 35.6% of the macaroni were blended with 64.4% cheese sauce (without added water) before freezing. The firmness and moisture contents are shown in Table 2.

TABLE 2

| Sample conditions | Firmness | Moisture content |
|---|---|---|
| After oven heating | 6.9 kg | 76.0% |
| After steamtable standing | 5.8 kg | 77.3% |

These results show that the firmness is significantly inferior to the firmness of the macaroni of Example 1.

COMPARATIVE EXAMPLE B

The elbow macaroni pastas prepared as in Example 1 were dried in a humidity dryer (75-80% relative humidity) at 49°-55° C. for 7 hours to a moisture content of 12.8%. The dehydrated elbow macaroni were then boiled to a moisture content of 62.6%, and 35.6% of these cooked macaroni were blended with 64.4% cheese sauce before freezing. The firmness and moisture contents are shown in Table 3.

TABLE 3

| Sample conditions | Firmness | Moisture content |
|---|---|---|
| After oven heating | 7.7 kg | 74.1% |
| After steamtable standing | 7.0 kg | 76.8% |

These results show that the firmness of dehydrated cooked macaroni is inferior to the firmness of the macaroni of Example 1.

EXAMPLE 2

Dry linguines (9-13% moisture) were boiled to a moisture content of 63% coated with 2% by weight of butter and partially dried at a temperature of 176° C. for 5 minutes to a moisture content of 50.5%. 70 g of these partially dried linguines were packaged with 270 g of water and frozen.

After one week and ten months storage in frozen condition, these frozen linguines were microwave heated at high power for five minutes and the firmness and moisture content were determined as in Example 1. The results are shown in Table 4.

TABLE 4

| Sample conditions | Pasta firmness | Moisture content |
|---|---|---|
| 1 week storage | 9.2 kg | 68.9% |
| 10 months storage | 8.4 kg | 73.9% |

These results indicate excellent pasta firmness.

EXAMPLE 3

A similar procedure to that described in Example 2 was followed but prior to packaging with water, the partially dried linguines were chilled for 20 minutes. The firmness and moisture contents are shown in Table 5.

TABLE 5

| Sample conditions | Pasta firmness | Moisture content |
|---|---|---|
| 1 week storage | 9.5 kg | 66.7% |
| 10 months storage | 8.7 kg | 73.0% |

These results show that a chilling step prior to packaging with water helps to retain even more pasta firmness and to further reduce water absorption when compared with Example 2.

COMPARATIVE EXAMPLE C

Dry linguines were boiled to 63% moisture content, coated with 2% by weight of butter, and 70 g of these coated linguines were packaged with 270 g of water and frozen. The firmness and moisture contents after 1 week and ten months storage in frozen condition followed by microwave heating at high power for 5 minutes are shown in Table 6.

TABLE 6

| Sample conditions | Pasta firmness | Moisture content |
| --- | --- | --- |
| 1 week storage | 8.6 | 73.4 |
| 10 months storage | 7.1 | 76.9 |

These results indicate significantly inferior firmness of the linguines and an increased moisture content when compared with the linguines of Examples 2 and 3.

We claim:

1. A process for the production of a frozen pasta product comprising cooking a shaped pasta dough to provide a cooked pasta, partially drying the cooked pasta to provide a partially dried pasta, blending the partially dried pasta with a substance selected from the group of substances consisting of sauce, water and a combination thereof to form a blend of the substance and partially dried pasta and then freezing the blend.

2. A process according to claim 1 wherein the dough is a dry dough.

3. A process according to claim 1 wherein the partially dried pasta has a moisture content of from 40% to 60%.

4. A process according to claim 1 wherein the cooked pasta has a moisture content of from 60% to 70% and is then partially dried to a moisture content of from 40% to 60%.

5. A process according to claim 4 wherein the cooked pasta is partially dried to a moisture content of from 42% to 55%.

6. A process according to claim 4 wherein the dough is cooked at a temperature of at least 97° C. and the cooked pasta is partially dried at a temperature of from 120° C. to 185° C.

7. A process according to claim 6 wherein the cooked pasta is partially dried for from 1 minute to 15 minutes.

8. A process according to claim 1 further comprising coating the cooked pasta with a food-acceptable fatty material and then partially drying the fatty-coated cooked pasta.

9. A process according to claim 8 wherein the fatty material is coated on the cooked pasta in an amount of from 0.5% to 5% by weight based upon a weight of the cooked pasta.

10. A process according to claim 8 further comprising chilling the partially dried pasta to a temperature of from 0° C. to 15° C. and then blending the chilled partially dried pasta with the substance.

11. A process according to claim 4 further comprising chilling the partially dried pasta to a temperature of from 0° C. to 15° C. and then blending the chilled partially dried pasta with the substance.

12. A process according to claim 11 further comprising coating the cooked pasta with a food-acceptable fatty material and then partially drying the fatty-coated cooked pasta.

13. A process according to claim 5 wherein the dough is cooked at a temperature of at least 97° C. and further comprising chilling the partially dried pasta to a temperature of from 0° C. to 15° C. and then blending the chilled partially dried pasta with the substance.

14. A process according to claim 13 further comprising coating the cooked pasta with a food-acceptable fatty material and then partially drying the fatty-coated cooked pasta.

15. A process according to claim 4 wherein the substance is water and wherein the water is blended with the partially dried pasta in an amount of from 2 times to 10 times an amount of the partially dried pasta on a weight for weight basis.

16. A process according to claim 5 wherein the substance is water and wherein the water is blended with the partially dried pasta in an amount of from 2 times to 10 times an amount of the partially dried pasta on a weight for weight basis.

17. A process according to claim 4 wherein the substance is a combination of water and sauce and wherein the sauce is blended with the partially dried pasta in an amount of from 1 time to 3 times an amount of partially dried pasta on a weight for weight basis and wherein the water is blended with the partially dried pasta in an amount up to an amount of water removed from the cooked pasta during partially drying.

18. A process according to claim 5 wherein the substance is a combination of water and sauce and wherein the sauce is blended with the partially dried pasta in an amount of from 1 time to 3 times an amount of partially dried pasta on a weight for weight basis and wherein the water is blended with the partially dried pasta in an amount up to an amount of water removed from the cooked pasta during partial drying.

* * * * *

UNITED STATES PATENT AND TRADEMARK OFFICE
CERTIFICATE OF CORRECTION

PATENT NO.  : 5,139,808
DATED       : August 18, 1992
INVENTOR(S) : Gale J. BARNES, et al.

It is certified that error appears in the above-identified patent and that said Letters Patent is hereby corrected as shown below:

Column 1, line 56, delete "the".

Column 2, line 58, delete "pre-".

Column 2, line 62, delete "pre-".

Column 3, line 17, after "of" insert --sauce may--.

Signed and Sealed this

Thirty-first Day of August, 1993

Attest:

BRUCE LEHMAN

Attesting Officer

Commissioner of Patents and Trademarks